United States Patent
Moore, Jr. et al.

(10) Patent No.: US 8,151,999 B1
(45) Date of Patent: Apr. 10, 2012

(54) PLASTIC SEPTIC TANK HAVING LAYERED COMPOSITE WALL

(75) Inventors: Roy E. Moore, Jr., Killingworth, CT (US); Kruger Kurt, Hamden, CT (US); Douglas Hardesty, East Lyme, CT (US)

(73) Assignee: Infiltrator Systems, Inc., Old Saybrook, CT (US)

( * ) Notice: Subject to any disclaimer, the term of this patent is extended or adjusted under 35 U.S.C. 154(b) by 284 days.

(21) Appl. No.: 12/455,774

(22) Filed: Jun. 5, 2009

Related U.S. Application Data

(60) Provisional application No. 61/131,022, filed on Jun. 5, 2008.

(51) Int. Cl.
*B01D 12/00* (2006.01)
(52) U.S. Cl. .................................. 210/532.2
(58) Field of Classification Search ............... 210/532.2
See application file for complete search history.

(56) References Cited

U.S. PATENT DOCUMENTS

| | | | |
|---|---|---|---|
| 3,383,004 A | | 5/1968 | Closner |
| 4,143,193 A | | 3/1979 | Rees |
| 4,359,167 A | | 11/1982 | Fouss et al. |
| 4,366,917 A | | 1/1983 | Kotcharian |
| 5,220,823 A | | 6/1993 | Berg et al. |
| 5,321,873 A | | 6/1994 | Goria |
| 5,372,763 A | * | 12/1994 | Hordis ............... 264/46.5 |
| 5,406,759 A | | 4/1995 | DeRosa et al. |
| 5,441,632 A | * | 8/1995 | Charon ............... 210/170.08 |
| 5,470,515 A | | 11/1995 | Grimm et al. |
| 6,170,201 B1 | | 1/2001 | Mason et al. |
| 6,261,490 B1 | | 7/2001 | Kliene |
| 6,282,763 B1 | | 9/2001 | Goria |
| 6,698,610 B2 | | 3/2004 | Berg et al. |
| D498,815 S | | 11/2004 | Greer |
| 6,852,788 B2 | | 2/2005 | Stevenson et al. |
| 7,144,506 B2 | | 12/2006 | Lombardi, II |
| 7,178,686 B2 | | 2/2007 | Bolzer et al. |
| 2001/0019026 A1 | | 9/2001 | Berg et al. |

(Continued)

FOREIGN PATENT DOCUMENTS

EP 1557 251 7/2005

(Continued)

OTHER PUBLICATIONS

Nassar Delphin Group, "NDG Compact Sewage Treatment Plants," www.nassar-delphin-group.com (undated), pp. 1, 2, 7, 31, 34, 45, 47.*

(Continued)

*Primary Examiner* — Chester Barry
(74) *Attorney, Agent, or Firm* — C. Nessler

(57) ABSTRACT

A septic tank or storage tank has a corrugated thermoplastic wall which has a composite layered structure. A tank wall comprises an inner layer of solid plastic for containing liquid; an outer layer made of solid plastic, for resisting external mechanical forces, and a middle layer of closed cell foam plastic for both resisting liquid flow which penetrates the inner or outer layer and for heat retention which encourages biological processes. In an embodiment, the middle layer has less than about 55 percent of the density of the inner and outer layers, and the inner layer is substantially thinner than the outer layer. The three layers are integrally attached at the time of formation of the tank by rotational molding. The tank has good resistance to mechanical forces and provides insulation.

20 Claims, 6 Drawing Sheets

U.S. PATENT DOCUMENTS

2002/0153380 A1    10/2002   Wade
2005/0184000 A1*    8/2005   Jowett ........................ 210/220

FOREIGN PATENT DOCUMENTS

EP        1649997      4/2006
GB      2369596      6/2002

OTHER PUBLICATIONS

Nugent, Paul "Rotational Molding: A Practical Guide" www.paulnugent.com (2001) p. 119-124; 333-344; 465-471; 575-589.

Antosiewcz, F. "Plastic Vaults Help Lighten Burial Burden" Plastic News (Aug. 13, 2007) 2 pg.

Bay Systems, "Structural Foam Rim" www.rimmolding.com (2004). 2 pg.

Premier Plastics Inc "Low Profile Supertank™ Septic Tank" www.premierplastics.com (2007) 2 pg.

Nassar Delphin Group "NDG Compact Sewage Treatment Plants" www.nassar-delphin-group.com (Undated) p. 1, 2, 7, 31, 34, 45, 47.

Rotonics Manufacturing Inc., "Septic Tanks" www.rotonics.com (2005) 2 pg.

Rotonics Manufacturing Inc. Cistern and Septic Tanks, www.rotonics.com (2003) 2 pg.

Roth Global Plastics Inc. "Plastic Septic Tanks Tanks" www.fna.lo.net (2007) 1 pg.

* cited by examiner

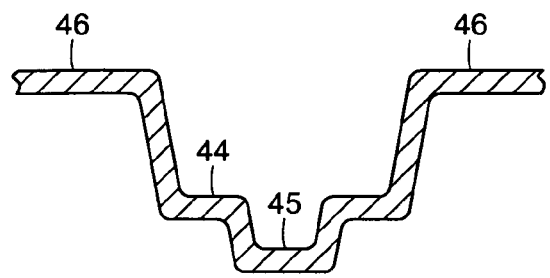
FIG. 4
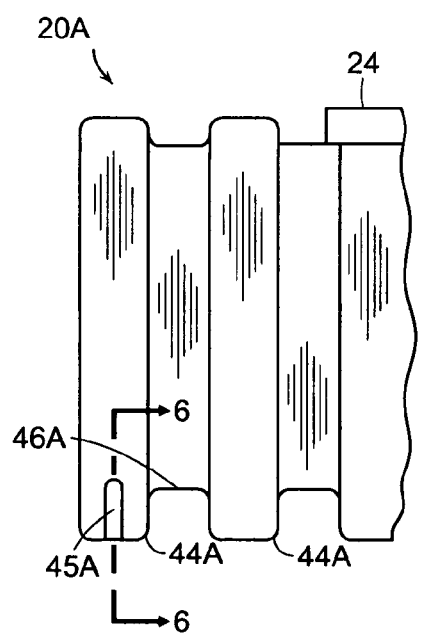 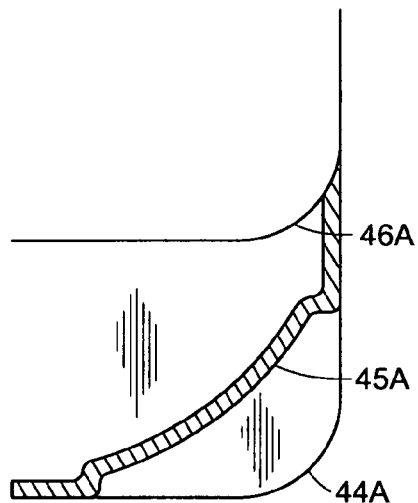
FIG. 5      FIG. 6

PLASTIC SEPTIC TANK HAVING LAYERED COMPOSITE WALL

This application claims benefit under benefit under 35 U.S.C. 119(e) of U.S. provisional application No. 61/131,022, filed on Jun. 5, 2008.

TECHNICAL FIELD

The present invention relates to thermoplastic tanks, suited for burial in soil, and for containing and treating wastewater or other liquids.

BACKGROUND

Molded plastic septic tanks have been used commercially in substitution of older and more widely used concrete tanks. Prior art plastic tanks have been made from thermoplastic or thermoset plastic, as for instance is exemplified by fiberglass-resin tanks. Plastic septic tanks have tended to be generally rectangular or round in cross section. They are often heavily ribbed or corrugated for strength, when buried in soil. Typical popular volume capacities are in the range 1000-1500 gallons. Septic tanks must have top openings with closures, to permit maintenance. Most septic tanks have at least one baffle which limits lengthwise flow within the tank, and divides the tank into an input end portion and the output end portion.

Thermoplastic septic tanks have typically been made of polyethylene or other polyolefin, using processes which include blow molding and rotational molding. The walls of prior art polyethylene tanks have been made of fully dense, or solid, polymer, with thicknesses in the range of one quarter to three eights of an inch. Examples of such tanks can be seen in various U.S. patents.

Depending on a particular user's viewpoint, thermoplastic septic tanks offer advantages and disadvantages compared to concrete tanks. Advantages include light weight and thus easy portability, resistance to fracture from dropping or freezing, and corrosion resistance. Disadvantages compared to concrete tanks have included higher cost, lower strength under load, susceptibility to local impact damage, light weight (which makes them buoyant when in watery soil) and lower stiffness, which can result in distortion during installation and use.

Thermoplastic septic tanks have had modest market place acceptance in substitution of the concrete tanks. Many installers only favor them when their light weight eases access to sites having difficult terrain. Thermoplastic septic tanks have tended to be more costly than comparable volume concrete tanks. That can be attributed in large part to the amount of comparatively costly plastic material and labor of manufacture.

Prior art plastic septic tanks have evidenced other limitations in varying degree, which the present invention seeks to address. These include undue deformation prior to installation, during installation and during use. In particular, a tank might deform too much when it is vacuum tested prior to use; or it may deform due to pressure of the surrounding soil when it is emptied for maintenance. During installation, plastic tanks walls have been penetrated by materials handling equipment and the impact of stones. Tanks have experienced short term and long term deformation under static loads from water and soil, including loads applied by any buoyancy hold-downs. Thus there is a continued need for improvement in the foregoing and other respects.

SUMMARY

An object of the invention is to provide a plastic tank for containing wastewater and other waters, and a method of making same, which has a combination of features which include: That tanks resist a multiplicity of forces, including those imposed by handling and shipping; that tanks not unduly deform during installation and use, due to mechanical forces and due to heating in the hot sun. That tanks resist downward forces applied to the top, including force due to the weight of overlying soil and any vehicles passing across the soil surface, along with force applied by anchoring devices which resist tank buoyancy. That a tank resist impact damage from handling equipment, for instance prongs of fork lift trucks, and from stones which may hit the tank when the tank excavation is backfilled with soil. That tanks pass a regulator-required vacuum test before use, e.g. evacuation to 2.5 to 4 to 7 inch column of Hg negative pressure, which simulates inward soil forces. That a buried tank resist inward deformation, due to the force of loose soil and hydrostatic pressure of any ground water. That a tank resist progressive shrinkage or compression, due to repetitive thermal contractions relative to the soil. That a tank maintain conditions which engender the desirable microbiological processes, including retarding loss of heat from waste water which is warmer than the soil. A still further object is to provide the foregoing features for a cost which is at least comparable to current technology plastic tanks and which is attractive in competition with concrete tanks.

In accord with the invention, a thermoplastic septic tank or storage tank has a composite wall which comprises an inner layer of solid plastic for containing liquid; an outer layer made of solid plastic, for resisting external mechanical forces, and a middle layer of closed cell foam plastic for both resisting liquid flow which penetrates the inner or outer layer and for heat retention which encourages biological processes. The three layers are integrally attached at the time of formation of the tank by rotational molding.

Further in accord with an embodiment of the invention, a tank is made of thermoplastic for treating or containing waste water when buried beneath soil, comprising a generally cylindrical tank body which has a transverse cross section which is nominally rectangular, round or some other shape. The tank has a wall which defines a center section running circumferentially around the tank length axis, two spaced apart lengthwise ends, a bottom for supporting the tank during use, a top for resisting weight of soil when the tank is buried, opposing lengthwise running sides. The tank is configured to resist forces applied to the tank when the tank is buried in soil and empty of liquid content, and when the tank is handled before and during installation with soil. There are at least two spaced apart openings in the top. The tank has a multiplicity of alternating peak and valley corrugations which run in circumferential direction around the tank. The tank wall is comprised of (a) an inner layer LI of solid plastic for containing liquid within the tank; (b) a middle layer LM of closed cell foam plastic, for, resisting passage of both liquid and heat; and, (c) an outer solid thermoplastic layer LX, for resisting external mechanical objects. Each of said three layers is substantially continuous and free of voids. The several layers are fused to each other during a rotational molding process in a way which provides structural integrity to the wall.

In further accord with an embodiment of the invention, the closed cell foam middle layer has a density of less than 55 percent of the outer layer, and a solid inner layer which is thinner than the outer layer. More particularly, the middle layer is more than 50 percent of the thickness of the total thickness of the wall. More particularly, the layers LI and LX have a density of about 60 pounds per foot and the layer LM has a density in the range of 12-20 pounds per cubic foot.

In further accord an embodiment of the invention, a tank has a wall as set forth above, wherein as a percent of the total wall thickness, the middle foam plastic layer LM is between about 69 and about 80 percent; the outer solid layer LX is between about 14 and about 23 percent, preferably between about 19 to about 21 percent; and the inner layer LI is between about 0.4 and 17 percent, preferably between about 7 to about 17 percent.

In further accord an embodiment of the invention a tank in accord with the foregoing embodiments has a tank exterior volume which is at least 5 percent greater than the tank interior volume; and or the tank wall has a thermal resistance substantially greater than 2 hour-inch$^2$-° F./BTU; and or the tank wall has a section modulus about an axis which is transverse to the wall thickness at least about 0.05 inch$^3$.

In another embodiment of the invention, a tank has one or more of the foregoing features in combination with lengthwise corrugations which add strength to the tank as a whole and in particular which resist downward forces in the center section and inward forces on the bottom and ends and sides, as a consequence of a vacuum test or field condition imposing similar forces. An embodiment of tank in accord with the invention changes volume by less than one percent when subjected to an internal pressure of about minus 2.5 inch Hg, and even up to minus 5 or minus 7.5 inch Hg, all relative to atmospheric pressure.

The foregoing and other objects, and the features and advantages of the present invention will become more apparent from the following description of preferred embodiments and accompanying drawings.

BRIEF DESCRIPTION OF THE DRAWINGS

FIG. 4 is a cross section through a portion of the corrugated wall of the septic tank of FIG. 1, showing a rib on a valley corrugation.

FIG. 5 is a side elevation view of the end of a septic tank having wall with a peak corrugation having a strengthening rib.

FIG. 6 is a cross section through the lower portion of the tank shown in FIG. 5.

DESCRIPTION

The tanks of the present invention may be made of high density or low density polyethylene (HDPE, LDPE); alternately they are made of polypropylene (PP), another polyolefin, or another thermoplastic. The shortened term "plastic" is used herein to refer to a thermoplastic of the foregoing types. A tank of the present invention is made by rotational molding.

In the typical commercial rotational molding process, a hollow aluminum mold is heated and then simultaneously rotated about three orthogonal axes, and granular plastic material is placed within the cavity of the closed mold. The heat of the mold melts the plastic and it flows on the mold inner surface mold to form the part. The mold is cooled, typically by a water spray, and the mold is and split apart, so the molded article can be removed. The present septic tanks are among the larger things made by rotational molding and their physical size presents problems. To the extent a mold is not properly rotated or is not properly heated, unacceptable wall thickness variation can result. Also, the production rate for a given piece of equipment may be economically insufficient. A unique rotational molding apparatus and process is advantageously used in making the product of the present invention, as described further below. Generally, the mold temperature is controlled by hot and cold fluid flow channels in or on the mold. The tank of the present invention has a special layered wall construction which is detailed below and which is particularly enabled by the process.

Septic tanks and other tanks used for underground storage are subject to a multiplicity of different loads and demands, as described in the Background above. Such tanks compare to tanks which are used for above ground storage of liquids and which have less complex demands. The invention will be useful for other tanks which are buried during use and suited for storing liquids. The embodiments of the invention are particularly described in terms of a septic tank having a generally oblong shape. References herein to the features of a septic tank will, unless otherwise stated, assume the tank has a cylindrical length axis (L in the Figures) is in a horizontal position, which is its use-position when buried in soil. As used herein, "soil" should be understood to refer to any of a variety of wet or dry granular medium having a density of 60 to 120 pounds per square foot.

Figure 1:
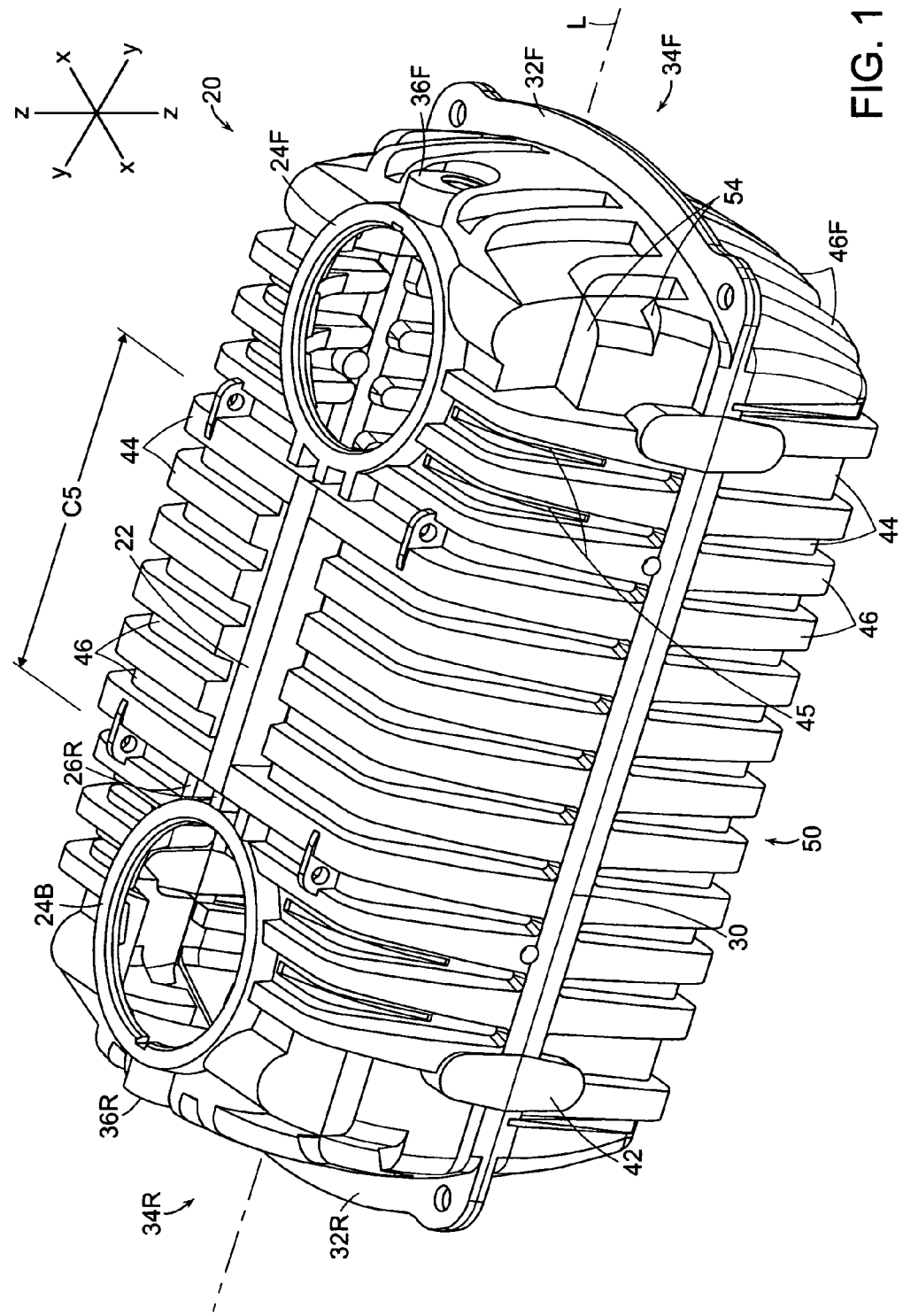
FIG. 1 is an isometric view of a septic tank, showing the top and an end.
Figure 2:
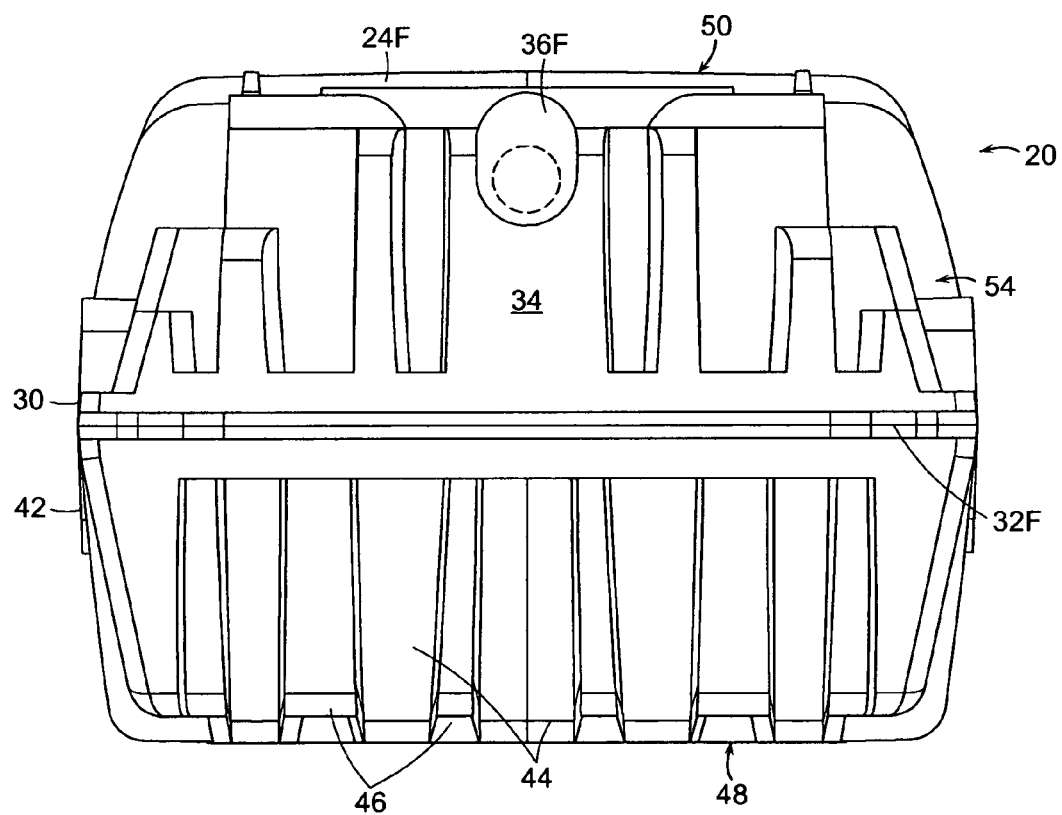
FIG. 2 is an elevation view of the front end of the FIG. 1 tank.
Figure 3:
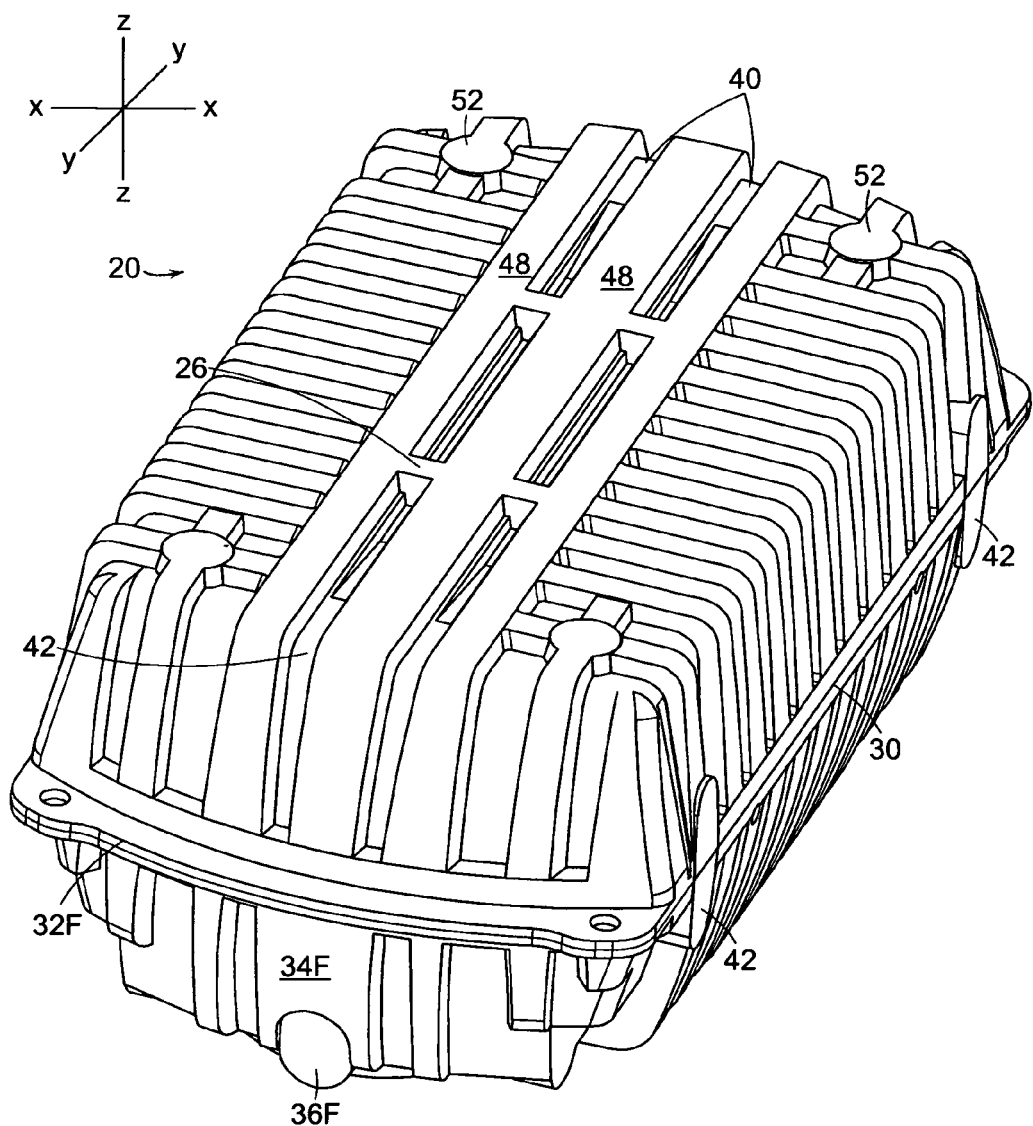
FIG. 3 is an isometric view of the FIG. 1 tank, showing the bottom and an end.
Figure 7:
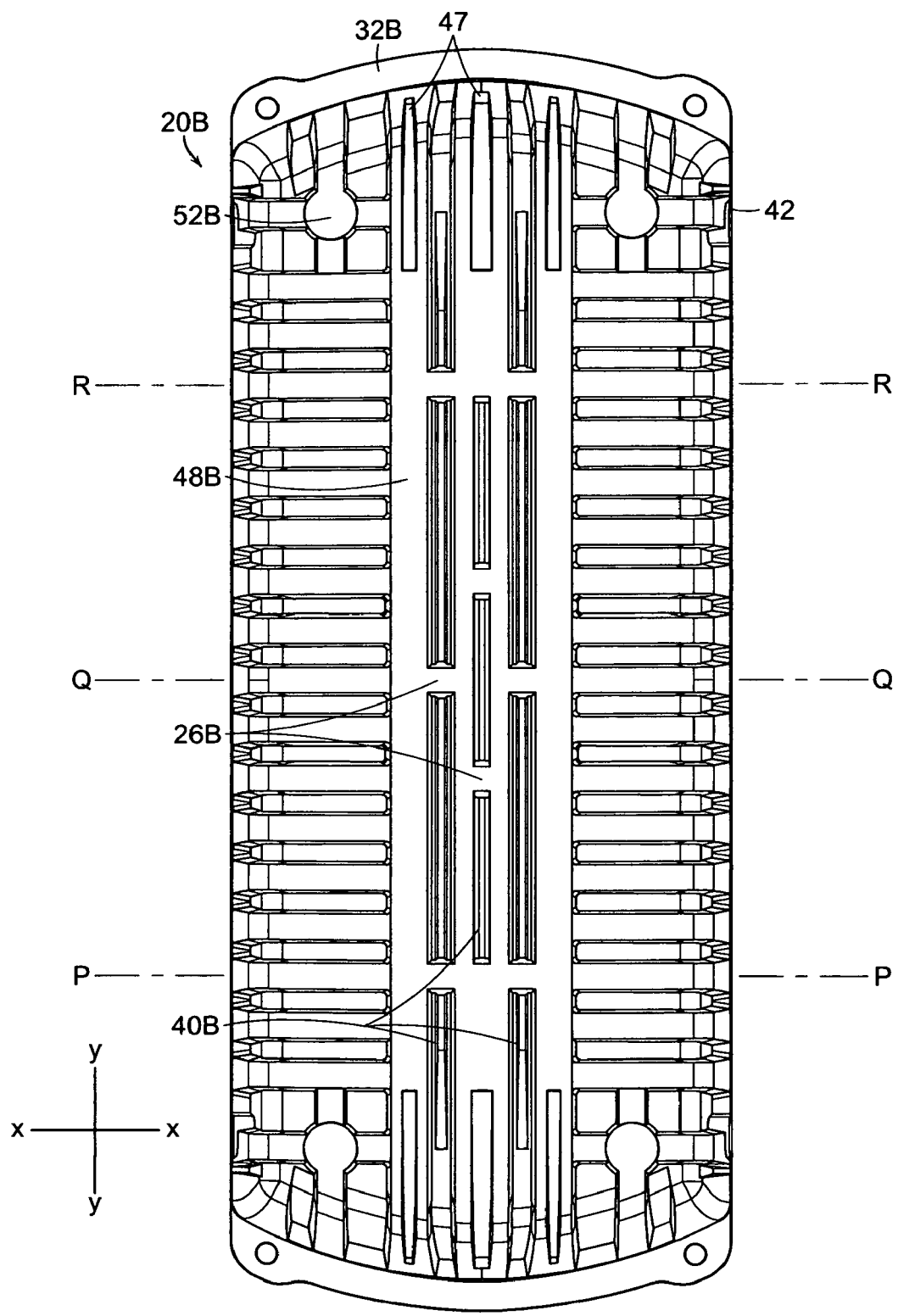
FIG. 7 is a bottom view of a septic tank showing circumferentially corrugations along with end corrugations having ribs, as well as a pattern of lengthwise beam structures.
Figure 8:
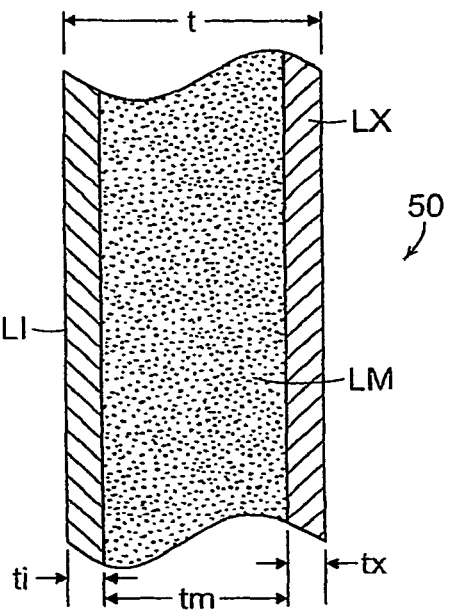
FIG. 8 is a cross section of a three layer composite wall of a septic tank.

An isometric top-down view of a representative tank is shown in FIG. 1. FIG. 2 is an end view of the front end of tank 20. FIG. 3 is an isometric view looking at the bottom of a tank which is turned upside down. FIG. 7 is a bottom view of a slightly different design tank, discussed below. The tank is referred to as being "generally cylindrical", albeit the cross section may be nominally oblong or rectangular (as illustrated by the Figures). In alternate embodiments, the cross section may be more nearly round, or of some other symmetrical or non-symmetrical shape. For simplicity of description, some nomenclature applicable to circular cross section may be used, e.g., circumference, refers to the length of the periphery, or path around the outer bound of the cross section of the tank; and, the mean transverse dimension is loosely referred to as the diameter.

As the Figures herein illustrate, an exemplary tank 20 comprises a wall 50 which bounds and defines the interior volume of the tank. When reference is made herein to the thickness of the tank wall (or of the layers which comprise the wall), that is a reference to the average thickness. The average thickness can be determined by dividing the volume of material in the wall or layer, as applicable, by the mean surface area of the wall/layer, where mean surface area is the average of the inner and outer surface areas of the wall/layer. An alternate way of determining wall thickness is to gage representative points of the tank. For example, plugs may be core-drilled from the tank, randomly or in an engineering judgment way, at a multiplicity of representative points. For example, a tank may drilled 40 locations and the readings of the wall, and the layers comprising such may be measured. The specific location data may be averaged to find the average wall thickness.

Tank 20, shown in FIG. 1, is nominally rectangular in cross section, side view and end view. In other embodiments, the tank cross section may be trapezoidal or round. Tank 20 has a wall 50 characterized by corrugations comprised of peak corrugations 44, spaced apart by valley corrugations 46. The corrugations run transverse to the length axis L of the tank. Corrugations are among the features which can present difficulties in obtaining a desired consistency of thickness when using a rotational molding process. The wall forms the bottom, sides and top of the tank. There are end wall portions 34, namely 34F and 34R. (The suffixes F and R indicated elements which correspond with one another at opposing ends of the tank.) The ends are nominally dome shaped and have upward running peak and valley corrugations like those of the sides, along with a horizontal beam structure 52, for rigidity.

The tank illustrated may have a volume of about 1050 gallons and a nominal liquid rated capacity of 1000 gallons. An exemplary tank may be about 124 inches long, about 66 inches wide and about 51 inches high and may have two about 24 inch diameter ports 24. Other tanks may have rated liquid capacities of 900, 1250, and 1500 gallons, with proportionately greater actual volume. For economy of tooling, the length of a mold is changed by using a replaceable center section insert; and the ends of all the sizes of tanks are the same.

A septic tank which embodies the invention has at least one port on a cylindrical length side. Typically, there are two spaced apart ports, 24F, 24R, one at either end of the tank, as shown in FIG. 1. The ports provide access to the tank interior. The ports are closed by covers, not shown. The covers may be mounted atop sleeves or other adapters, not shown, which may be fastened to the top of the tank at the port locations.

The end walls, or more simply, the ends 34F and 34R, bulge outwardly and thus are nominally dome shaped. There are vertical corrugations running upward and downward from a central beam 32 which extends outwardly like a flange. Each end 34 has a buttress 36 comprising a flat surface which is adapted for being cut open to provide a hole for water pipe entry. The beam-flange 32 at each end provides strength and for engaging soil and resisting buoyant forces. Each of the four top corners of the tank have a series of steps or buttresses 54 which provide good strength to the corners of the tank.

The walls 50 at the opposing left and right sides of the tank, as seen in the end view, bow outwardly at the midpoint, at which point there is a lengthwise non-corrugated portion 30. See FIG. 3. In an alternate embodiment, the non-corrugated portion running horizontally along the sidewall is not present, and the lower half and top half ribs and valleys interleave directly with each other. The tank has other strengthening features, such as molded integral beam structure 22 having a generally H-shape on the top; and lengthwise running integral beam structures 48 on the bottom, with associated connectors 26 and channels 40A, 40B, as shown in FIG. 3. See also. which are described more particularly in a commonly owned U.S. patent application Ser. No. 12/455,782 filed on Jun. 5, 2009 by Kruger et al., "Corrugated septic tank with strengthening features." The disclosure of the foregoing patent application is hereby incorporated by reference. The tank of the invention also desirably has internal strengthening features, as described in the Kruger et al. application. For instance, a bulkhead which separates the fore and aft parts of the chamber may have structural members which resist inward and downward forces. Alternately, there may be struts which run both horizontally and vertically. The internal strengthening features may be mechanically affixed or welded or adhered in place.

Tank 20 is characterized by a central portion CS which has a continuous circumferential wall. The section CS is about one-third of the tank length. In section CS wall 50 runs fully around the tank and thus there is continuity of the special wall layered structure which is described below. The section CS is good at resisting inward and outward forces, whereas there is interruption in the structure where there are ports. On the other hand, the section can deform when there are high vertical loads alone or in combination with loads that may be present if the tank is emptied, or evacuated as part of a test procedure. Such characteristics affect strength and preclude the use of molding processes other than rotational molding; for example, those processes which might be used to make vessels of the nature of basins or tubs.

Ribs, which are shallow compared to the depth of the valley corrugations, run lengthwise in some of the valley or peak corrugations, to enhance strength by increasing local section modulus. In FIG. 1, ribs 45 ribs extend inwardly into the interior part of the chamber. Ribs 45 run along part of the length of valleys 46, at portions of the valleys which curve upwardly from the side of the tank to the top. A cross section of a rib 45 is shown in FIG. 4. Similar kinds of ribs may be placed elsewhere, for instance in the peak corrugations as they curve around the bottom ends the tank, i.e., in the corrugations 46E which run down from beam 52, shown in FIG. 1. FIG. 7 shows ribs 45B in the valley corrugations 46B of tank 20B. FIG. 5 shows a fragment of the end of tank 20A having a rib 45A in peak corrugations 44A. FIG. 6 is a cross section through the rib 45A showing how the rib (which appears as a groove in the peak corrugation when viewed from outside the chamber) is shaped. The ribs may alternately not taper at their ends but may be more abrupt. Similar kinds of ribs 49 may be placed in the peak corrugations at the bottom lengthwise edges of the tank as illustrated by the portion of a tank 20A shown in FIG. 5. Each rib 45, 49 preferably tapers to a lesser depth at each end of the rib, as illustrated by the vertical plane cross section in FIG. 6.

As shown in FIGS. 1-3, tank 20 has pads 42 on the sides, and pads 52 on the bottom 48 of the tank for supporting the tank on its side, as when it is stored or shipped. To enable attachment of lifting devices, end beam-flange 32 has holes 60 and there are lugs 62 with holes on top of the chamber.

In embodiments of the invention, the wall is comprised of two or three layers of plastic which are integrally connected. The layers structurally cooperate to provide a wall that has particularly favorable properties insofar as utilization of material, flexural modulus, creep strength and impact strength are concerned. A two or three or more layer wall structure, where the layers have different densities or mechanical properties, is frequently referred herein as a composite wall. The layers are melt-fused to each other during the rotational molding process.

In one embodiment, the inner layer and the outer layer have significantly different thicknesses. A three layer composite wall of the invention provides several surprisingly good mechanical property and other performance advantages over prior art septic tanks that have single layer solid walls, and better meets most of the objects of the invention than do the prior art tanks.

FIG. 4 shows a cross section through a typical portion of a preferred three layer tank wall 50. The wall 50 has a total thickness t. The outer layer LX has a thickness tx, the inner layer LI has a thickness ti; and, the middle layer LM has a thickness tm. As described below there may be fewer and more than three layers.

In an embodiment of the invention, detailed further below, the outer layer is about 0.15 inch thick, a middle layer is about 0.5 inch thick, and the inner layer is about 0.05 inch thick. In an embodiment of the invention, the exterior layer LX, sometimes called the skin, and the inner layer LI are solid. That means they have nominally full density, as such full density is known to be achieved by rotational molding. A full density thermoplastic, such as polyethylene, will have a density about 60 lb/cubic ft (0.0393 lb/cubic inch). The middle layer is foamed polyethylene having closed cells. It will have a selected density which is one-third to one-sixth of the density of the solid layer. For example, the middle layer density may be between 10 lb/cu ft and 20 lb/cu ft (0.0063 to 0.0126 lb/cubic inch). The solid inner or outer layers, LI and LX, may be comprised of sub-layers as described further below.

The foam middle layer LM runs continuously between the inner and outer layers. It is characterized by an absence of any large hollows, i.e., it is free of substantial voids or discontinuities as characterize certain other plastic forming processes. The foam plastic of the middle layer is considered "closed cell." By that is meant that it preponderantly comprises cells or voids which are closed; but there may be some interconnected or open cells or cracks. Another way of defining the character of the foam layer is that the layer is substantially free of voids which are larger than the two-sigma maximum size of the cells.

Since the foam is preponderantly closed cell, the desirable insulative property of the wall, described below, is not upset, should there be an inner or outer layer crack, by the foam filling with water. A further feature of the composite wall is that water ingress or egress is inhibited should the outer wall be damaged, as by an impacting object during handling or backfilling.

In another embodiment of the invention, the inner solid layer LI is quite thin. It may be about 0.002-0.003 inches thick. Such a layer may be formed of the same plastic material which is used to create the foam middle layer LM. Despite its thinness, the layer may still provide a small flexural modulus benefit compared to having no layer LI.

Table 1 shows data for different embodiments of the invention. They may be compared to a prior art HDPE molded tank which has a solid wall of about 0.25-0.40 inch, typically about 0.38 inch. Example A shows a first embodiment; Example B shows an embodiment where all the layers are thinner. Example C shows a still thicker wall in all respects. Example D is illustrative of a very thin inner layer on the foam. In Example E, the thinner layer is on the exterior and the thicker layer may be on the interior.

With reference to Table 1, in an embodiment of the invention, the outer layer LX is between 0.08 and 0.15 inches thick; the middle layer LM is between about 0.4 and 0.6 inches thick; and the inner layer LI is between 0.003 and 0.10 inches thick.

The weights of the different layers on a unit area basis may be calculated in context of the densities which are mentioned above and that will provide a set of unique weight relationships, similar to the relationships recited herein for thicknesses. From the foregoing, it is seen that through the use of a composite wall, a septic tank of the present invention containing the same weight of plastic as a solid wall prior art tank provides advantages in section modulus and related advantages in mechanical strength, for example, short term flexural strength. The tank also has substantially enhanced ability to retain heat.

Table 1 characterizes the wall dimensions in terms of absolute layer dimension and the percentage of the total wall thickness which each layer comprises. In embodiments of the invention, as a percent of the total wall thickness, the middle layer LM is foamed plastic and is between about 69 and about 80 percent; the outer layer LX is between about 14 and about 23 percent, preferably between about 19 to about 21 percent; and the inner layer LI is between about 0.4 and 17 percent, preferably between about 7 to about 17 percent. Thus, the middle layer LM is about 2.3 to 4 times the thickness of the total of the solid layers (i.e., 69-80 percent divided by 20-31 percent).

From Table 1 one may readily calculate corresponding weight percentage relationships amongst the layers, to define in an alternative way the ranges of the invention. For example, in an exemplary 3 layer tank wall, in which the foam is about 70% of the wall thickness, the wall will have an average density which is less than about 53 percent of the density of the full density wall which characterizes a typical solid tank, where both wall have the same weight of material per unit area. More specifically, when the foam density is between 10 and 20 lb/cu. ft., then the average density of a composite wall of the present invention wall is between 0.25 and 0.32 lb/cu. ft. Those densities are respectively between about 42 and about 53 percent of the density of a solid wall, again, where both the solid and composite walls have the same weight of plastic per unit area. Thus, in an embodiment of the invention, a tank has a composite wall comprised of a solid outer layer, a foam middle layer having a density less than 55 percent of the outer layer, and a solid inner layer which is thinner than the outer layer. The parameters in this paragraph can further be considered in combination with the thickness ranges which are recited in the preceding paragraph.

TABLE 1

Absolute and relative thicknesses of layers of a composite wall of a septic tank

| | | Thickness - inches | | | |
|---|---|---|---|---|---|
| Example | Parameter | Inner layer ti | Middle layer tm | Outer layer tx | Total wall t |
| A | Thickness - inch | 0.05 | 0.50 | 0.15 | 0.70 |
| A | Relative Percentage | 7 | 71 | 21 | 100 |
| B | Thickness - inch | 0.04 | 0.38 | 0.13 | 0.55 |
| B | Relative Percentage | 7 | 69 | 23 | 100 |
| C | Thickness - inch | 0.06 | 0.60 | 0.15 | 0.81 |
| C | Relative Percentage | 7 | 74 | 19 | 100 |
| D | Thickness - inch | 0.003 | 0.60 | 0.15 | 0.753 |
| D | Relative Percentage | 0.4 | 80 | 20 | 100 |
| E | Thickness - inch | 0.10 | 0.4 | 0.08 | 0.58 |
| E | Relative Percentage | 17 | 69 | 14 | 100 |

A flat segment of polyethylene composite sidewall, where the outer layer is about 0.15 inch thick, the middle layer is about 0.5 inch thick, and the inner layer is about 0.05 inch thick, about an axis which is transverse to the wall thickness has a section modulus which is in the range of about 0.05 $inch^3$ to about 0.08 $inch^3$. See the data in Table 3, discussed below. That is substantially greater than the section modulus of a solid wall having of the same weight of plastic per unit area (which would be about 0.37 inch thick) for which the section modulus is about 0.023 $inch^3$. Assuming the same composition and properties of plastic in the solid portions of the composite wall as are in the wholly solid wall of a comparison tank, the increased section modulus provides increased mechanical properties against certain loads and limits, as is well known. So, for example, compared to a flat specimen solid wall having the same weight of plastic, the short term flexural modulus of a flat specimen extracted from a composite wall having the foregoing typical dimensions will be increased, compared to a comparable weight per unit area solid wall specimen. As mentioned, it is desirable that the tank have good impact strength; and to the extent there may be damage, to avoid fracture or penetration to the extent there can be flow of liquid between the interior and exterior of the tank. Impact strength may be measured by dropping a shaped weight, often referred to as a dart onto the surface of a specimen or structure. Reference may be made to ASTM D5628-96 and the Assoc. of Rotational Molders Cold Impact Temperature test, as published by the Association. A tank having a wall with the layer thicknesses described above has good impact resistance in such kind of tests. To the extent there might be a crack in the outer wall of the tank which is a result of impact or some other failure mode, the closed cell foam middle layer of a composite wall prevents movement of fluid between the crack and the interior of the tank; and, to the extent the foam layer might be also cracked, the inner layer serves as a last barrier.

The desirable composite wall constructions which have been described make the volume of the tank exterior between about 5 to 9 percent or more than volume of the inside of the tank. That compares with a solid wall tanks of the prior art, where the exterior volume of the tank is not more than about 3 percent greater than the interior volume of the tank. The increased exterior volume of the wall and tank, without a commensurate increase in plastic weight (and cost) provides to an observer and user a desirable impression of substance and solidity, notwithstanding there are real mechanical and thermal advantages of the construction, as described here.

As mentioned in the Background, an aim is to reduce the deformation of the tank during service. A measure of that deformation which is used by some sanitary system regulators is to subject the tank to a partial evacuation, e.g., a negative pressure of 2.5 to 7 inch Hg. The extent to which the tank changes dimension is measured. For instance change in length can be measured for a tank which does not have the lengthwise beam strengthening on the present invention. In one criterion, the tank ought not change in volume by more than one percent. In another criterion, the inward bulging of the side and bottom walls of the tank are measured against an established limit. Since the mechanical properties, including flexural modulus and section modulus are increased by the wall of the invention, stiffness is increased, and as a result deformation of the tank during vacuum testing and during use is decreased. The invention tank meets requirements which comparable weight per unit area solid wall tanks do not meet. Thus, the invention comprises a method of improving the resistance of a plastic septic tank to deformation when subjected to an external pressure of at least 2.5 inch Hg.

Tables 2 and 3 show certain mechanical properties of 2 inch by 2 inch specimens removed from walls, representative of the invention and solid wall tanks sold in commerce. The specimen INV is representative of the present invention, namely of a composite having a 0.15 inch solid outer layer, a 0.55 inch foam center layer, and a 0.06 inch solid inner layer. It is compared to specimens from solid walls, namely, those labeled AS, AF, AR and AN. While all those specimens are nominally solid, there is some variation in the measured density. Table 2 shows the comparative properties. Table 3 shows the same specimens, but with normalization so that all have the same weight per unit area. Weight is a measure of the cost of plastic. The data show that INV has the greatest normalized thickness (70% greater than the nearest tank) and more than 100 percent greater section modulus.

TABLE 2

Mechanical properties of different walls from tanks

| Wall Specimen | Thickness inch | Volume cu. in. | Weight lb/sq in. | Density lb/cu. in. |
|---|---|---|---|---|
| INV | 0.64 | 2.56 | 0.041 | 0.16 |
| AN | 0.37 | 1.48 | 0.050 | 0.34 |
| AS | 0.35 | 1.40 | 0.045 | 0.32 |
| AF | 0.33 | 1.32 | 0.036 | 0.27 |
| AR | 0.27 | 1.08 | 0.038 | 0.35 |

Figure 9:
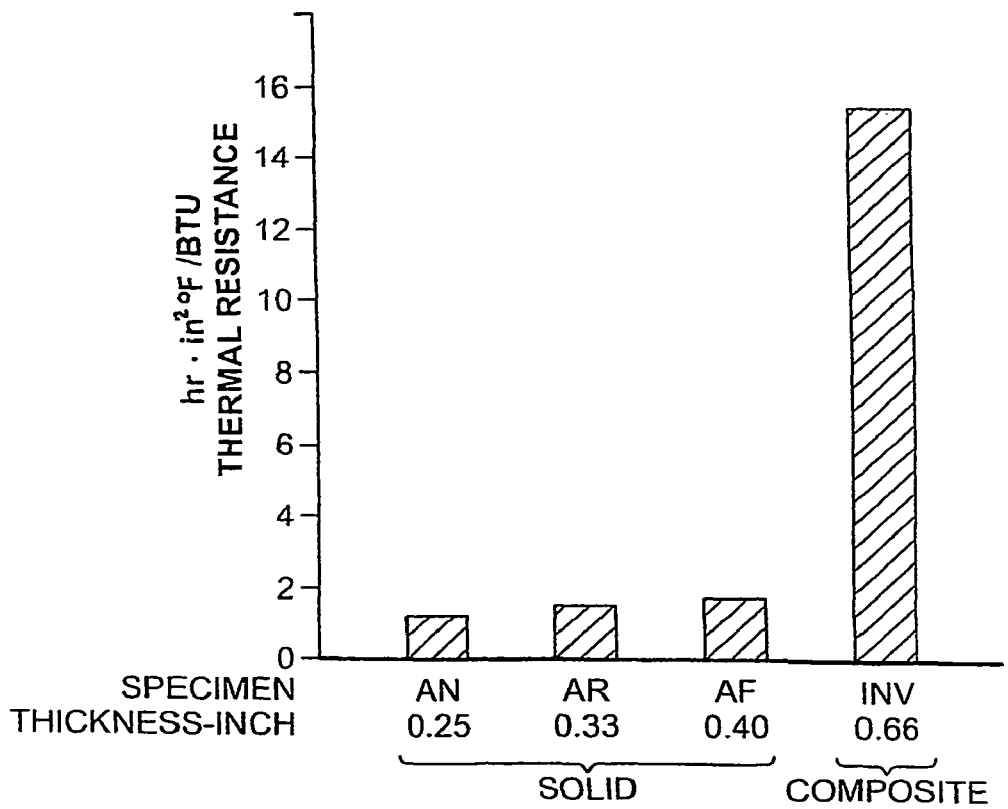
FIG. 9 is a graph comparing thermal resistances of different thickness solid plastic walls in comparison to a three layer foam containing wall of the present invention.

A composite tank wall has surprisingly good heat retention, or insulative, values. FIG. 9 shows how thermal resistance (a reciprocal of thermal conductivity) in hour-inch$^2$-° F./BTU of the wall varies with wall thickness and structure, for polyethylene tanks. Wall specimens AN, AF, AR are solid, as indicated by the prefix S which is associated with the thickness dimension along the horizontal axis. Thermal resistance increases with thickness, as expectable. Specimen INV is a wall piece which is characteristic of the invention, being a composite having 3 layers, namely 0.15 inch solid outer, 0.50 inch foam center (of about 10 lb per cu. ft density), and 0.01 inch solid inner wall. FIG. 5 illustrates that the thermal resistance of the invention tank wall is nominally 10 times better. In other embodiments, where the foam layer has higher density and thus higher thermal conductivity, or where the layer is thinner, a wall of the present invention will have at least 3 times, more likely at least 5 times, the thermal resistance of a solid tank wall of the same plastic composition and weight per unit area.

TABLE 3

Section modulus when Table 2 data is normalized to provide equal weight per unit area

| Wall Specimen | Thickness inch | Volume cu. in. | Weight lb/sq in. | Density lb/cu. in. | Sect. Modulus cu. in. |
|---|---|---|---|---|---|
| INV | 0.64 | 2.56 | 0.041 | 0.16 | 0.68 |
| AF | 0.38 | 1.52 | 0.041 | 0.27 | 0.24 |
| AS | 0.32 | 1.27 | 0.041 | 0.32 | 0.17 |
| AR | 0.29 | 1.17 | 0.041 | 0.35 | 0.14 |
| AN | 0.30 | 1.22 | 0.041 | 0.34 | 0.15 |

As a point of reference, the weight per unit area of a wall specimen INV is in approximation about equal to or less than the weight per unit areas of a wall specimen AF. So another way of looking at the foregoing heat retentive multiples is as follows: To have the same heat retention as a 3 layer composite wall like specimen INV (having about 0.041 lb of plastic per sq. in. of surface area), a solid wall would have to be between 1.2 and 3.8 inch thick (according to whether the applied multiple is 3, 5 or 10, as above).

Because of the enhanced insulation, a tank of the present invention not only retains heat within the tank, but lessens the degree to which the plastic exterior will change temperature relative to the surrounding soil. That is, the time function of temperature change will be extended and the exterior of the tank, and thus the average temperature of the wall of the tank, may change less than when the wall is solid and less insulative. That may help ameliorate what can happen when a tank buried in soil shrinks due to thermal contraction: A void can be created around the exterior of the tank, giving the surrounding medium the opportunity to fill the void, and the medium may not be expelled from the void when the tank returns to its high temperature. This may result in progressive change in exterior size of the tank, thus decreasing the volume of the tank.

Rotational molding is a commercially known process, with skill being exercised to make large objects with adequate control of wall thickness, in the context that there is a need to avoid excess weight of plastic and associated cost. In a first process variation, the wall and tank are created by depositing a first quantity and type of plastic within the mold, and rotating the mold, so the particulate plastic melts and forms the first layer LX, which will be the outer layer of the tank when it is removed from the mold. While the plastic of layer LX is still hot, a second quantity of foamable plastic is introduced into the mold interior and melted to form the foam layer LM. The process is such that layer LM becomes integrally attached or fused to layer LX.

While the second layer LX is still hot (or if it has cooled, when it has been re-heated), a third quantity of plastic is introduced, and melted, to form an inner layer LI which is integrally attached during the molding process to the still hot surface of the layer LM. In a variation, appropriate temperature control of the mold during the formation of layer LX and will lead to formation of the third or inner layer LI by glazing or surface melting of the foam layer.

In a variation, the outer layer LX may be comprised of two solid sub-layers. For instance, if the exposed surface of the tank is desired to be made of a high cost colored plastic backed up by a black lower cost plastic. Then, the step of forming layer LX would be comprised of two sub-steps, where as in the example, a first charge of colored particulate plastic is deposited, followed by a second charge of black particulate plastic. Likewise, two different layers having different mechanical properties may be used to form a particular layer.

In both variations, the mold is cooled, to cool and harden the plastic of the wall, whereafter, the mold is opened and the tank is removed. In accord with the art of rotational molding, to aid the process of melting of the second and third layers, the interior the mold may be heated, as by flowing hot air. To speed cooling, the interior may be supplied with cool air and or moisture.

An alternative process of forming the first and second layers may be carried out by a commercially known procedure referred to as the "one-step method." In this, fine particulates of plastic, for forming the solid outer layer are introduced into the hot mold along with pellets, i.e., larger particulates of second foamable material. Thus, the finer particles melt first, followed by the pellets, which take longer to melt and foam owing to their larger volume to surface area ratio. A first mold temperature and a second higher mold temperature may also be used to successively melt the solid and foam materials when they have the physical (size differences) mentioned, or when they have suitably different melting points. The one-step process may be followed by a fusing process and or by delivering heat (e.g., hot air) to the interior of the just formed two layer structure, to melt a portion of the foam layer and to seek to form a third solid layer. Or, there may be addition and melting of a third particulate, to form the third layer, e.g., of a lower melting point material.

For technology on forming the tanks of the invention, see the book by Paul Nugent, "Rotational Molding: A Practical Guide," www.paulnugent.com (2001), particularly Sections 6.5.4; pages 333 to 335; Sections 8.15, 8.16, 8.5.8, the disclosures of which are hereby incorporated by reference.

The tank of the invention can be made using the technology embodied in the Leonardo™ rotational molding system of Persico S.p.A, a manufacturer in Nembro, Italy. In a mold used with the automated equipment of the Leonardo system, heating and cooling of the mold is achieved by channeling hot or cool liquids through or around the molds. The system is good at achieving the desired temperatures throughout the mold, despite section size and surface area changes. It thus obtains good distribution of plastic within the mold, good wall thickness control, and high production rates, characteristic of the invention and heretofore unobtainable by conventional rotational molding systems. Reference may be made to the manufacturer and patent publications, for example, European Patent Publications EP 1837148A2, EP 1808280A2, U.S. Patent Publication 2006/0088622, U.S. patent application Ser. No. 11/653,367, and Italian patent documents MI 2002A0011, MI 2004A002018, MI 2006A000557 and MI 2007000510, all of which disclosures are hereby incorporated by reference. The precise nature of the bond between the layers is that which results from the rotational molding process and the parameters and materials which are used.

In summary, the advantages of the septic tank of the invention include: a wall with high section modulus and resultant good bending strength, to resist high transient during handling and installation; high creep strength, to resist steady structural loads, in particular bending and columnar loads which are applied to the exterior of the tank during use and storage; high impact strength, to resist penetration and leakage as a result of concentrated impact loads that are applied to the tank during handling and installation, for instance by materials handling equipment or rocks; and, good insulation values for heat retention, to retain heat and to engender temperature stability, to encourage bacterial action.

Although this invention has been shown and described with respect to one or more embodiments, it will be understood by those skilled in this art that various changes in form and detail thereof may be made without departing from the spirit and scope of the claimed invention. The present inventions and different variations and features and advantages have been described or are implicit in the foregoing.

We claim:

1. A molded tank made of thermoplastic for receiving, treating or containing waste water when buried beneath soil, comprising
   an elongate integral tank body having opposing ends spaced apart along the tank body length and a wall which forms (a) a bottom, (b) a top having at least one opening for access to the interior of the tank, (c) opposing lengthwise-running sides;
   the tank body having a center section located between said openings, where said wall runs circumferentially around the length axis of the tank and said wall has a multiplicity of circumferentially-running peak corrugations and valley corrugations;
   wherein the tank wall is comprised of (a) an inner layer LI of solid thermoplastic for containing liquid within the tank; (b) a middle layer LM of closed cell foam thermoplastic, resistant to passage of both liquid and heat and structurally connecting the inner layer and an outer layer; and, (c) an outer solid thermoplastic layer LX, resistant to the force of external mechanical objects and passage of liquid;
   wherein, said middle layer LM is integrally fused to both the inner layer LI and outer layer LX;
   wherein, each of said three layers is free of substantial voids and extends continuously within the tank body;
   the tank formed by a molding process which integrally fuses said layers to each other during formation of each, to thereby provide structural strength to said wall.

2. The tank of claim 1 wherein the closed cell foam plastic of middle layer LM has a density of less than 55 percent of the density of the outer layer, and wherein the inner layer is substantially thinner than the outer layer at said center section.

3. The tank of claim 1, wherein the middle layer is between 69 and 80 percent of the thickness of the total thickness of the wall at said center section.

4. The tank of claim 1, wherein as a percent of the total wall thickness at said center section, the middle foam plastic layer LM is between about 69 and about 80 percent; the outer solid layer LX is between about 14 and about 23 percent; and the inner layer LI is between about 0.4 and 17 percent.

5. The tank of claim 4 wherein the percentage of the outer solid layer LX is between about 19 to about 21 percent; and wherein the percentage of the inner layer LI is between about 7 to about 17 percent.

6. The tank of claim 1 wherein the layers LI and LX have a density of about 60 pounds per cubic foot and the layer LM having a density in the range of 12-20 pounds per cubic foot; and wherein the inner layer is substantially thinner than the outer layer.

7. The tank of claim 1 wherein the thickness of the middle foam plastic layer LM is about 70 to 80% of the total thickness of the wall.

8. The tank of claim 1, wherein the tank exterior volume is at least 5 percent greater than the tank interior volume.

9. The tank of claim 1 wherein a portion of the wall of said center section has a thermal resistance substantially greater than 2 hour-inch$^2$-° F./BTU and a section modulus about an axis which is transverse to the wall thickness of at least about 0.05 inch$^3$.

10. The tank of claim 1 made by rotational molding.

11. A molded thermoplastic septic tank for treating or containing waste water when buried beneath soil, comprising a generally cylindrical tank body having a length, spaced apart integral ends, an integral bottom for supporting the tank during use, an integral top for resisting weight of soil when the tank is buried, opposing lengthwise running sides, and at least one opening in the top, the tank having an exterior volume which is at least 5 percent greater than the interior volume thereof and a wall comprised of (a) a first layer LX of solid plastic, forming the exterior surface of the tank; (b) a second layer LM of closed cell foam plastic having a density which is substantially less than 55 percent of the density of the outer layer LX, integrally fused during formation to the first layer LX; and, (c) a third layer LI forming the interior surface of the tank, integrally fused during formation to the second layer LM; wherein the third layer LI is substantially thinner than the first layer LX.

12. The tank of claim 11 wherein the transverse cross section of the tank is generally rectangular and wherein the tank is made of a polyolefin.

13. The tank of claim 12 wherein a portion of said wall section has a thermal resistance substantially greater than 2 hour-inch$^2$-° F./BTU and a section modulus about an axis which is transverse to the wall thickness of at least about 0.05 inch$^3$.

14. The tank of claim 11 wherein the thickness of the first layer LI is between about 0.08 and 0.15 inch thick; the thickness of the second layer LM is between about 0.4 and 0.6 inch thick; and the thickness of the third layer LX is between about 0.002 and 0.050 inch thick; and wherein the overall thickness of the wall no more than about three quarters of an inch thick.

15. The tank of claim 14 wherein the first layer is about 0.15 inch thick.

16. The tank of claim 11 wherein the tank has a interior volume of more than 1000 gallons.

17. The tank of claim 11, which when situated in air of the atmosphere, has the property of changing in either length by no more than about one percent when the interior pressure is reduced to a pressure of 2.5 mm Hg less than atmospheric pressure.

18. In a method of treating wastewater, wherein water is flowed from a source to an oblong molded plastic septic tank having a corrugated solid plastic exterior surface wall, wherein the water has an average temperature greater than the ambient temperature of the soil in which the tank is buried, and wherein the tank has a volume of greater than 1000 gallons and spaced apart access ports in the top of the tank, the improvement which comprises: fusing a closed cell structural foam layer to the entire interior of said exterior surface wall to form a continuous insulative layer.

19. The method of claim 18 wherein the improvement further comprises, fusing a layer of solid plastic to the entirety of the inner surface of said closed cell structural foam layer, to thereby form the interior surface of the tank which contains said water, wherein the thickness of said interior surface layer is substantially less than the thickness of said solid plastic exterior surface wall.

20. The tank of claim 19 wherein the thickness of the middle foam plastic layer LM is about 70 to 80 percent of the total thickness of the wall.

\* \* \* \* \*

UNITED STATES PATENT AND TRADEMARK OFFICE
CERTIFICATE OF CORRECTION

| | | |
|---|---|---|
| PATENT NO. | : 8,151,999 B1 | |
| APPLICATION NO. | : 12/455774 | |
| DATED | : April 10, 2012 | |
| INVENTOR(S) | : Roy E. Moore, Jr. et al. | |

It is certified that error appears in the above-identified patent and that said Letters Patent is hereby corrected as shown below:

Title page, item [75] inventor: Kruger Kurt should be -- Kurt Kruger --

Signed and Sealed this
Third Day of July, 2012

David J. Kappos
*Director of the United States Patent and Trademark Office*